Aug. 9, 1960    E. C. HANDWERK ET AL    2,948,591
SELENIUM RECOVERY PROCESS
Filed March 22, 1957
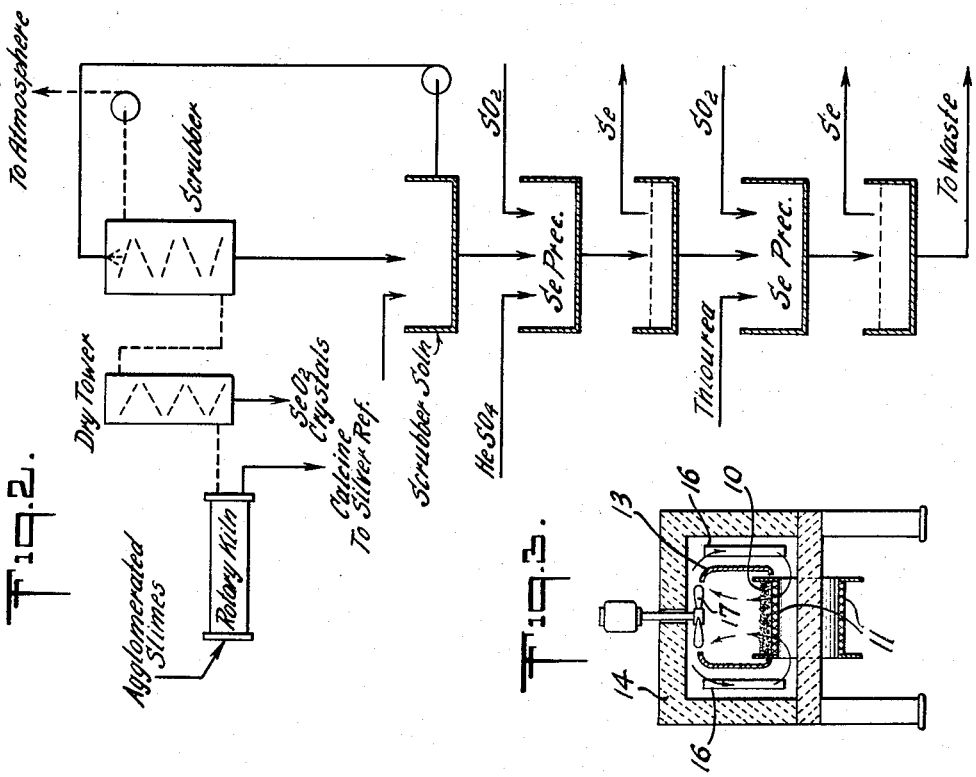
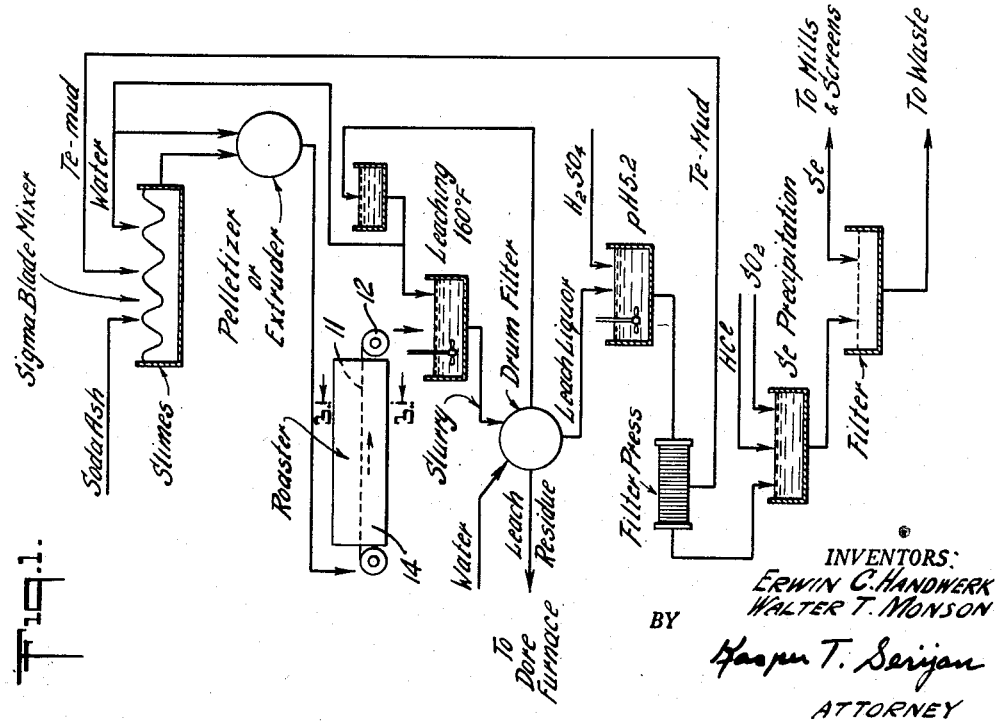
INVENTORS:
ERWIN C. HANDWERK
WALTER T. MONSON
BY
Harper T. Serijan
ATTORNEY

United States Patent Office 2,948,591
Patented Aug. 9, 1960

2,948,591
SELENIUM RECOVERY PROCESS

Erwin C. Handwerk, Lehighton, Pa., and Walter T. Monson, Newark, N.J., assignors to American Metal Climax, Inc., New York, N.Y., a corporation of New York Filed Mar. 22, 1957, Ser. No. 647,819

5 Claims. (Cl. 23—139)

This invention relates to the processing of selenium-bearing materials such as slimes, sludges, muds and the like and relates more specifically to a process for the separation and recovery of selenium from complex mixtures as occur, for example, in the anode slimes formed during electrolytic copper refining operations. In one of its aspects, the invention relates to an improved process for converting the selenium which is present in such mixtures to water-soluble form whereby the selenium values may be recovered substantially in the form of elemental selenium. Another aspect of the invention concerns an improved process for volatilizing the selenium whereby a major portion of the selenium value is converted to selenium dioxide.

Practically all selenium is obtained as a by-product of precious metals recovery from electrolytic copper refinery slimes. The principal methods of slimes treatment for the separation of selenium and other values are (1) smelting with soda ash, (2) roasting with soda ash and (3) roasting with sulfuric acid, the latter method resulting in the volatilization of the selenium primarily as selenium dioxide. The details of these processes including various modifications thereof are described in an article by Schloen and Elkin entitled "Treatment of Electrolytic Copper Refinery Slimes," J. of Metals, May 1950, Transactions AIME, vol. 188, pp. 764–777. In United States Patent No. 2,775,509 there is disclosed a modified volatilization process which effects the recovery of selenium as selenium dioxide by heating the slimes in an oxidizing atmosphere under controlled conditions to avoid fusion of the mass during the oxidation step whereby the recovery of the product as selenium dioxide resulting from the subsequent volatilization is improved.

Since the smelting process involves appreciable losses of selenium, in mattes, slags and flue dusts, the yields of selenium are generally below 80%. For this reason the smelting process has not been widely accepated as a satisfactory method for selenium recovery. In general, the processes comprising (a) solubilizing the selenium by roasting the slimes with soda ash followed by leaching the calcine in water, and (b) oxidizing the selenium in the slimes by roasting and volatilizing the selenium dioxide thus formed are generally preferred for enabling higher recoveries of selenium as elemental selenium or selenium oxides as the case may be.

In the soda roast process, the raw or decopperized slimes are intimately mixed with soda ash and the mixture is then roasted or baked preferably below the sintering point to permit access of the oxidizing atmosphere throughout the mass of material during the roasting step. The selenium present in the slime as selenium or selenide is converted to water-soluble sodium selenite or selenate. Following the roasting operation, the calcine is leached and the selenium, primarily in the form of elemental selenium, is recovered from the leach liquor using one of the several well known procedures applicable to the recovery of selenium from such solutions. In place of soda ash, other reagents such as the hydroxides, nitrates and carbonates of the alkali metals may generally be used in preparing the charge for the roasting operation.

The volatilization process as, for example, the procedure disclosed in U.S. Patent No. 2,775,509 involves the oxidation of the selenium and selenides present in the slime to form presumably metal selenite and selenate salts which are thermally decomposed to yield primarily selenium dioxide. The other oxides or oxygen-containing compounds of various oxidizable materials present in the slime are thermally stable at the temperatures used for eliminating the selenium dioxide and are accordingly left substantially in their entirety in the residue. Throughout the procedure the slimes are exposed to intimate contact with an oxidizing atmosphere to effect the desired oxidation in the absence of fusing or sintering of the mass and to carry off the selenium dioxide which is liberated. Sweeping with an oxidizing atmosphere during both the oxidation and the evolution of selenium dioxide steps is also advantageous for minimizing the effects of sulfur dioxide which may be formed during the process. The volatilized selenium dioxide may be recovered from the gas stream by condensation or scrubbing in accordance with well-known practices.

It will be seen that both of the above processes for recovering selenium values from slimes utilize a heating step wherein intimate contact with an oxygen-containing atmosphere such as air is essential. In both instances the subsequent yield of selenium either as elemental selenium or as the oxides of selenium is markedly influenced by the effectiveness of the initial conversion involving either (1) fixation of the selenium as water-soluble alkali metal selenite or selenate or (2) formation of metal selenite or selenate salts or other oxidized intermediates which are thermally decomposable to yield primarily selenium dioxide together with lesser amounts of selenium trioxide and elemental selenium.

For carrying out the aforesaid roasting or oxidation operations in the absence of appreciable sintering or fusing of the charge, the prior art methods disclose the use of controlled temperatures while processing the charge as, for example, in a Herrshoff furnace or apparatus of similar type with or without rabbling. At the same time, the oxygen-containing atmosphere is usually brought into contact with the charge by exposing the surface of the mass to the action of air or an oxygen-enriched gas. The use of air passed concurrently or countercurrently over the charge is also disclosed as is the penetration of the charge with air by directing the flow thereof either upwardly or downwardly through the mass.

Although the more recent methods for processing anode slimes and the like for the recovery of selenium values therefrom have overcome some of the basic difficulties encountered for many years, a serious difficulty still exists in that complete and effective conversion of the selenium in the roasting charge by the oxidizing atmosphere at the elevated temperatures normally used necessitates the use of extremely thin or shallow layers of the material in finely divided form. Although rabbling or other means of agitation such as that provided by a rotary kiln may be used in some instances to enhance the exposure of the charge surfaces to the action of the oxidizing or roasting atmosphere, the dusting losses and other processing complications incurred thereby precludes their extensive use. Consequently a sufficiently thin layer must be used to permit the necessary penetration or permeation of the charge by the oxidizing atmosphere within a reasonble period of time. With layers of a thickness appreciably more than about one-half inch or so, the processing time requirement becomes excessive and even with substantially increased reaction time, the desired conversion usually cannot be completely or satisfactorily effected. Thus, the throughput capacity of apparatus used in the roasting process is greatly restricted and processing costs are accordingly high.

It has now been found that the recovery of selenium from anode slimes and other selenium-bearing materials as muds, sludges, dusts, etc. can be much more efficiently and economically carried out by initially agglomerating the material to be roasted to provide pellets, pills, nodules and the like of any suitable size and shape for use in either solubilization roasting or volatilization processes. By agglomerating the material either as such or together with soda ash, etc. in a manner hereinafter described in detail, and thereafter oxidizing the agglomerated charge, preferably by passing the heated oxidizing gas therethrough, the penetration of the oxygen-containing atmosphere during the roasting or volatilization step and the resulting fixation of the selenium or its elimination from the charge, as the case may be, is markedly improved. As a result thereof, much thicker layers of the material can be processed through a specified reaction zone in a given period of time. The size and porosity of the particles formed by the agglomeration referred to herein should be such that in addition to penetration of the surrounding oxidizing atmosphere between the agglomerated entities comprising the charge, sufficient diffusion or permeation occurs to permit either substantially complete conversion or elimination of the selenium content of the individual agglomerates. The improved penetrability of the oxidizing atmosphere coupled with more uniform heat distribution made possible by the use of an agglomerated charge during the roasting operation virtually eliminate the tendency of the material to form a fused mass at the elevated temperatures required to effect the desired selenium conversion or elimination. The friable state of the roasted charge or the volatilization process residue which is consistently provided is highly advantageous for facilitating subsequent processing of the materials.

It is accordingly an object of this invention to provide an improved process for treating complex mixtures such as anode slimes and the like whereby the selenium and selenide content thereof is oxidized to selenite, selenate, or other oxidized intermediate compounds from which the selenium may be recovered either as elemental selenium or selenium dioxide by leaching or volatilization procedures.

It is another object of this invention to provide an improved process for the treatment of selenium-bearing materials whereby layers of substantially increased thickness may be effectively processed in an efficient and economical manner.

It is a further object of this invention to provide an improved process for recovering selenium from selenium-bearing materials such as slimes, sludges, muds, dusts and the like wherein the material mixed with an alkali metal salt or hydroxide is rendered more susceptible to the action of an oxygen-containing atmosphere during the roasting operation to convert the selenium to water-soluble form.

It is yet another object of this invention to provide an improved process for oxidizing selenium-bearing materials such as anode slimes and the like whereby the oxidation of the material at elevated temperature in the presence of an oxygen-containing atmosphere is completely carried out below the fusion point notwithstanding the use of relatively thick layers of the material as the roasting charge.

A still further object of this invention is to provide improvements in the processes for the recovery of selenium as elemental selenium or selenium oxides wherein the intermediate conversion step is made more effective thereby enhancing the efficiency and economy of intermittent or continuous processes applicable thereto.

Other objects and advantages will become apparent as this specification proceeds.

In accordance with the present invention, the slime or similar selenium-bearing material generally available in finely divided form is adjusted to a suitable moisture content to provide a pasty consistency and is agglomerated preferably by conventional pelletizing or extruding procedures in the presence of a binding agent such as bentonite, lignone or the like. The material agglomerated as pellets, pills, briquettes, or extrudes such as noodles, etc., may then be processed by heating in the presence of an oxidizing atmosphere whereby the selenium, after oxidation, is eventually eliminated from the charge by volatilization, mostly as selenium dioxide with some elemental selenium also being usually recoverable from the residue.

Alternatively, the slime may be combined with an alkali metal carbonate, hydroxide or nitrate or mixtures thereof with sodium carbonate being preferred and the mixture together with sufficient amounts of water to permit effective agglomeration of the material is similarly processed as by extruding, briquetting or pelletizing. In this case, the alkali metal compound serves as an effective binder and the use of other binders such as bentonite, etc. may obviously be omitted. The agglomerated material may then be processed in an oxygen-containing atmosphere preferably by passing the heated atmosphere through the porous bed provided by the agglomerates to form the water-soluble selenium salt which may thereafter be separated from the initial mixture by leaching.

Illustrative embodiments of the invention wherein an agglomerated charge may be advantageously used for the recovery of selenium from slimes and similar selenium-bearing materials are shown in the accompanying drawing in which:

Fig. 1 is a flow sheet showing the steps employed in a selenium recovery process wherein an agglomerated mixture of the slime and an alkali metal compound, namely, soda ash is used in the roasting operation;

Fig. 2 is flow sheet showing the sequence of steps involved in a selenium volatilization process utilizing by way of illustration a rotary kiln for oxidizing the agglomerated charge; and Fig. 3 is a vertical section taken along the lines 3—3 of Fig. 1 illustrating details of a preferred method for treatment of agglomerated slimes with reference to the rotating step wherein a heated oxidizing gas as air is forced through a fixed bed of the agglomerated material.

Although any of the conventional methods such as pelletizing, extruding, briquetting and the like for agglomerating finely divided materials may be used in preparing the slimes and related materials in the form of pellets, pills, nodules, spheroids or any other shapes suitable for use in accordance with the present invention, it is preferred to agglomerate the material either by pelletizing or extruding procedures. In view of the variations that are encountered in the nature and composition of electrolytic slimes which usually contain copper 11–67%, silver 330–8800 troy oz./ton (1–30%), gold 13–700 troy oz./ton (.04–2%), selenium 2–28%, tellurium from trace amounts up to about 8%, and other components such as lead, arsenic, silicon dioxide, etc., it will be readily apparent that the agglomerating procedures must be adapted accordingly particularly with respect to the amount of water, binding agents and the like required for the formation of agglomerates having the desired characteristics. In practice, the slimes are usually decopperized prior to use for the recovery of the selenium values but either raw or decopperized materials may be used in the processes herein described.

By way of illustration, the pelletizing of raw or decopperized slimes may be carried out with the use of any suitable apparatus such as a rotary drum or an inclined dish pan type of equipment as, for example, a Dravo-Lurgi pelletizer which consists of a hopper for containing the material to be pelletized, a feeder and a variable speed rotating disc with an adjustable rim, the height of which can be varied. The disc can be tilted to any desired angle from the horizontal. By controlling the feed rate of the material and the moisture at a fixed disc angle and rotational speed, the material is given a certain retention time for the formation of the desired pellets. Small particles grow to a regulated size, then overflow the rim of the disc which acts as weir into a container. For forming extrudes of noodle shape, apparatus such as a Bonnot extruder or a mechanized meat grinder equipped with a die plate having perforations of the desired size may be used.

The particle sizes comprising the agglomerates may be varied considerably depending upon (1) the shape of the agglomerated particles, (2) the specific selenium recovery process to be used relative to the oxidation conditions, temperature and time requirements involved in the process and (3) whether or not soda ash or a similar substance is incorporated in the mixture. In the case of pellets, diameters of from $1/16$ to about $3/4$ inch may generally be used, it being preferred, however, to use pellets ranging in diameter approximately from $3/32$ to about $1/2$ inch and optimally from $1/8$ to $1/4$ inch. When extrudes in the form of cylindrical noodles are to be used, the diameter thereof may similarly be varied as between $1/16$ and $3/4$ inch with the length thereof which is relatively unimportant generally varying from $1/4$ to $1\frac{1}{2}$ inches or longer depending upon the random breaking off point during the extrusion step. Good results are obtained with extrudes having a diameter or maximum thickness dimension depending upon the cross-sectional shape thereof of from $1/8$ to $3/8$ inch with excellent results being obtained with $3/16$ to $1/4$ inch diameter extrudes which are about 1 inch long. The selection of agglomerate sizes and shapes is largely dependent upon the temperature and time factors involved, it being apparent that for the larger agglomerates a longer heating period or relatively high temperature would generally be required.

In addition to regulated size of the agglomerates, the porosity of the compacted material must be such as to permit adequate penetration of the oxidizing atmosphere not only throughout the agglomerated mass but within the individual agglomerates as well. For this reason, the use of excessive compacting pressures and multiple passes of the material through an extruder should generally be avoided. At the same time, the individual agglomerates should possess sufficient unitary strength or binding characteristics to resist deterioration and crumbling of the agglomerates to any appreciable extent particularly during the subsequent heating step wherein the presence of an unduly large amount of fines is detrimental.

In forming pellets or extrudes having suitable physical properties and characteristics, the slimes should be sufficiently moistened to avoid dusting whereby loss of metal values would otherwise take place. In the absence of soda ash or equivalent alkali metal compounds in the slime compositions to be agglomerated, a binding agent such as bentonite, lignone, copper sulfate, zinc sulfate or the like must be added to provide the necessary binding matrix. From 3 to 10% or more by weight of a binding agent may generally be used depending upon the specific binder employed and the nature of the material being agglomerated and to somewhat lesser extent on the specific agglomerating procedure being used. In most instances, the use of from 4 to 8% of bentonite is preferred with best results being obtained with about 5 to 7%; somewhat smaller amounts of lignone (3 to 6%) have been found to provide satisfactory results. The presence of 7 to 15% and preferably from 9 to 12% by weight of water based on the dry weight of the slimes is generally sufficient to eliminate dusting during the agglomeration step while providing the proper consistency for effective agglomeration. The extrusion process generally requires a little more water than is required in pelletizing as by the method previously described. A good premixing of the charge is essential to obtain good distribution of the ingredients. The agglomerates may be dried prior to use or may be used in a moist condition depending largely upon the nature of the specific oxidation process to be used.

When an alkali metal compound is used in the charge to be agglomerated, from 35 to 60% by weight thereof may generally be used. Particularly with the use of soda ash which is preferred, from 45 to 55% gives good results with about 50% generally giving the best results. The water content based on the weight of the mixture (dry basis) may be varied as from 12 to 25% by weight or even more in some instances, but from 16 to 22% water is usually satisfactory with about 18 to 20% being conducive to best results in the usual case. Thorough mixing is highly important since a uniform distribution of the alkali metal compound throughout the mass is essential for effecting a substantially complete conversion of the selenium content of the slime during the roasting operation to the desired water-soluble, alkali metal selenium salt. With the use of any anhydrous alkali metal compound as sodium carbonate, hydration occurs during the agglomerating step providing composite particles having exceptionally desirable properties and characteristics. In such instances the conventional binder substances may be entirely omitted. With the use of sodium hydroxide, highly suitable agglomerates may be readily obtained in the absence of bentonite or similar binding agents.

The roasting step utilizing the agglomerated charge in accordance with the present invention may be carried out in any type of apparatus conventionally used in such operations whereby batch or continuous processing may be achieved with or without rabbling. The material may be heated in an oxidizing atmosphere, for example, in a muffle furnace, rotary kiln, rabbled furnace as a Herrshoff furnace or similar apparatus preferably adapted for continuous operation in accordance with conventional practices.

A preferred roasting process which has been found to be particularly suitable for the treatment of agglomerated slimes and especially agglomerates containing soda ash or the like, however, consists of forcing hot air through a porous bed of the material while the same is conveyed on an endless belt through a reaction zone of the type provided by a Steiner-Ives oven or similar apparatus. An embodiment of apparatus suitable for carrying out the roasting step in this manner is schematically illustrated in Fig. 1 with details thereof being more clearly shown in Fig. 3.

With reference to these figures, the agglomerated charge 10 is fed layerwise on an endless belt 11 supported on rolls 12 which provide a positive drive, the speed of which may be controlled. The endless belt fabricated preferably of wire mesh or similar materials which are resistant to deterioration under the reaction conditions involved should be of pervious construction to permit the passage of gases therethrough. A housing 13 of sheet metal or other suitable material substantially enclosing the region surrounding the upper surface of the belt during its passage through oven 14 provides a space between the interior and exterior surfaces of the oven and housing walls respectively. Through this space, freely admitted or a controlled amount of an oxygen-containing atmosphere such as air may be drawn as, for example, through the ends of the furnace or other suitable openings provided therein. This air may be heated in any suitable manner as by heating elements 16 and circulated by fans or blowers 17 in the direction indicated by the arrows in Fig. 3. In this manner, the heated air is continuously drawn through the pervious belt from the bottom upward and the charge on the belt is thus completely penetrated by the oxidizing atmosphere. The direction of flow is not important as long as the heated oxidizing atmosphere is drawn through the agglomerated charge either from below as shown in Fig. 3 or from the top through the bottom.

In oxidizing the agglomerated charge in accordance with the above procedure to provide a non-fused calcine from which the selenium may be recovered by leaching with water, roasting temperatures from 700 to as high as 1250 or 1300° F. may be used for the treatment of either raw or decopperized slimes with the agglomerates thereof being used as a feed in either a moist or dried state. It has been found that as the temperature of the roasting bed approaches 700–800° F., the reaction becomes exothermic and the bed temperature rises to about 1100° after which it gradually settles back to about 1000° and the reaction proceeds to completion to provide a non-fused calcine. The agglomerates are thermally stable at the indicated temperatures as indicated by flue tests showing no loss of selenium and the desired conversion to sodium selenite may be achieved without any appreciable dusting.

With the use of an agglomerated charge following the procedure described above, it has been found, surprisingly enough, that layers of substantially increased thicknesses may be processed to enable nearly quantative recoveries of the selenium content. Bed depths of from 1 to 6 inches or even thicker up to as much as about 12 inches may generally be used with about a 3 to 4-inch bed depth being preferred for continuous operation. The passage of the oxidizing atmosphere therethrough is not unduly restricted notwithstanding the use of moist as well as dried pellets or extrudes. During the roasting step using freely admitted air, the agglomerated charge is not susceptible to fusion over the indicated temperature range. This advantage which eliminates the need for precisely controlled reaction conditions is derived by virtue of the improved penetration of the oxidizing gas and the more uniform heat distribution made possible by the agglomerated state of the charge whereby the necessary degree of oxidation required to render the material resistant to fusion occurs very rapidly especially under the preferred mode of operation wherein the heated oxidizing gas is forced through the charge. Since layers of only about ½ inch or so of the unagglomerated charges could heretofore be processed with any appreciable success under comparable conditions of treatment, it will become readily apparent that the agglomerating step is of vital importance for greatly enhancing the quantity of material that may be processed through a unit of a given capacity.

Depending upon the shape and size of the agglomerates, moisture content, bed depth and other considerations particularly concerning the reaction temperature being used, the reaction time required for complete conversion of the selenium content to water-soluble form may be varied. Less than four hours is usually required, however, using the above described procedure consisting of forcing hot air through a fixed bed and, under optimum conditions, the roasting may be carried to completion in from ½ to 3 hours and usually in about 1 to 2 hours. Other procedures as, for example, roasting the agglomerated charge in a rotary kiln usually require relatively longer roasting periods but the desired oxidation proceeds in an otherwise completely satisfactory manner. The selenium recovery from the calcine may thereafter be made in accordance with conventional practices, a preferred sequence of steps of one such procedure being shown in Fig. 1.

The methods previously described for treatment of the agglomerates containing soda ash or the like may similarly be applied to agglomerates which do not contain any added alkali metal compound to effect volatilization of the selenium therefrom using, however, slightly higher reaction temperatures generally between 1100 and 1500° F. and preferably between 1200 and 1400° F. With the use of free admission of air heated and circulated as previously described practically quantitative elimination (over 98%) of selenium may be readily achieved using bed depths as high as 6 inches or more with the selenium primarily as selenium dioxide being collected in an appropriate collector system.

It has been further found that with an agglomerated charge, more commonly available equipment as, for example, a rotary kiln may be advantageously employed, it being essential, however, that a sufficient air flow be provided as, for example, by the use of a Root blower in conjunction therewith. Eliminations of the selenium content of the agglomerates consistently over 98–99% may be readily achieved using either moist or dry agglomerates of the type herein described and the selenium collection may be made in accordance with known procedures involving the use of dry or wet collector or scrubber systems or combinations of both as shown in Fig. 2. In addition to the formation of selenium dioxide, and some trioxide, elemental selenium may also be recovered by subsequent processing of the scrubber solution as indicated in the flow sheet.

The invention is illustrated in the following examples but is not to be construed as limited to details described therein. The parts and percentages are by weight except where specifically indicated otherwise.

*Example 1*

A batch of 2000 lbs. of decopperized slime from electrolytic refining of copper containing 5.9% selenium was combined with 1000 lbs. of sodium carbonate and to the mixture was added a total of 600 lbs. of water. The material was thoroughly mixed in a pug mill and then pelletized as previously described to form pellets of a −4 mesh +8 mesh U.S. standard screen size (0.187–.094 inch diameter).

The pelletized material was processed by roasting on a pervious travelling belt roaster utilizing an oven of the Steiner-Ives type with hot air being forced through the fixed bed of the agglomerated charge with the bed depth during drying and roasting being maintained at approximately 3 inches. Using a roasting time of 1½ to 3 hours and a roasting temperature averaging about 1000° F. with free admission of air, the roasting resulted in solubilization of more than 95% of the total selenium content. No dusting problems were encountered and flue tests showed no loss of selenium through volatilization.

Approximately 2900 lbs. of calcine in a friable but unfused state was obtained and to this was added an equivalent weight of water. The mixture was warmed to 160° F. with agitation. A leaching time of an hour was used to disintegrate the calcine and dissolve all selenium compounds after which the resulting slurry was passed through a drum filter. The leach residue containing silver, gold, platinum, lead, tin, etc., but substantially devoid of selenium was removed for subsequent processing as in a Dore furnace. To the leach solution was added concentrated $H_2SO_4$ in an amount (5–7% by volume) sufficient to provide a pH of 5.2 at which point the so-called "tellurium mud" containing Pb, Sn, $SiO_2$, etc., in addition to tellurium was formed. After filtration of this material to remove the filter cake which may be recycled to the head of the process as indicated in Fig. 1, the filtrate was further acidified with about 30% (by volume) of conc. HCl (1.19 Bé.) and sparged with $SO_2$ to precipitate Se in elemental form. The selenium, after a final filtration amounted to 110.7 lbs. (94% overall yield) and assayed better than 99% selenium.

*Example 2*

To 100 parts slimes, 40 parts soda ash and 100 parts nitre was added 20% water and the mixture was extruded into ¼ inch diameter x ¾ inch length strands which were then roasted in a Steiner-Ives oven for varying periods of time at 1000° F. The selenium solubilized after one hour was 87.5%; after 2 hours, 95.9%; and after 3 hours, 96.8%.

*Example 3*

Roasting wet pellets (−4 mesh +8 mesh) consisting of 100 parts slime, 50 parts $Na_2CO_3$ and 20% water in an internally fired rotary kiln using freely admitted air and maintaining a temperature gradient from 500° F. at the charge end to 1300° F. at the discharge end of the kiln resulted in solubilization of 92.7% after 2½ hours retention time. Extending the retention time to 7 hours resulted in quantitative conversion but the prolonged heating under the stated conditions of operation did not adversely affect the condition of the roasted charge. This experiment points up the importance of a forced circulation of the oxidizing gas (air) through the material for cutting down the time required for carrying the oxidation to the desired state of completion.

*Example 4*

Mixtures consisting of slimes, 50% soda ash and 18% water extruded as noodles of 3/16 inch diameter and averaging about ¾ inch in length roasted in a Steiner-Ives oven heated to 1000° F. gave the following results:

| Condition of Extrudes | Roasting Time (hrs.) | Percent of Total Selenium Solubilized |
|---|---|---|
| Wet | 3 | 99.7 |
| Dry | 1 | 95.2 |
| Dry | 2 | 95.8 |
| Dry | 3 | 99.0 |
| Dry | 4 | 100.0 |

In further experiments it was found that roasting of similar extrudes for 4 hours at 840° F. containing 30, 35, 40 and 45% soda ash resulted in a final solubilization of 76.1, 91.9, 95.1 and 96% respectively of the selenium content in the charge.

With cylindrical extrudes consisting of slimes and 50% soda ash and further containing between 17 and 25% moisture, processing batches of ⅛, ¼, ⅜, ½ and ⅝ inch diameter respectively at 1000–1200° F. similarly using a 3 inch bed depth and free admission of air results in substantially complete conversion of the selenium to water-soluble form usually in less than 4 hours.

*Example 5*

Several batches, each consisting of 3 kg. charges of −4 +8 mesh pellets containing 8% bentonite were processed in a rotary kiln at temperatures of 1200 to 1250° F. for 4 hours using an air flow of 5 cubic feet/minute and a retort rotation of 2 r.p.m. In ten such runs, selenium elimination from the agglomerated charge was excellent averaging 99% of the selenium charged to the kiln. A method for the recovery of the selenium as the dioxide and also in the form of elemental selenium is shown in Fig. 2.

Obviously, many modifications and variations of the present invention are possible in the light of the above teachings. It is therefore to be understood that, within the scope of the appended claims, the invention may be practiced otherwise than as specifically described.

We claim:

1. In the process for treating a selenium bearing material such as copper anode slimes, muds, sludges and dusts wherein the material in finely divided form is controllably heated in a selenium-oxidizing atmosphere to convert the selenium content thereto to an oxidized state without appreciably fusing the charge whereby the selective separation of selenium from said material is facilitated, the improvement which comprises intimately mixing the selenium-bearing material with a binder and sufficient water to provide a consistency of the mixture suitable for agglomeration, compacting the resulting mixture to provide porous agglomerates having a maximum thickness of from ⅛ to ¾ of an inch, subjecting a charge of said agglomerates consisting of a charge bed thickness in excess of 1 but less than 12 inches to said controlled heating in the presence of said oxidizing atmosphere to oxidize the selenium content of the charge at a temperature above 700° F. but below the fusion temperature of the agglomerates and separating the oxidized selenium from said charge.

2. The process for treating a selenium-bearing material such as anode slimes produced in the electrolytic refining of copper for the separation of the selenium values therefrom, which comprises the steps of intimately mixing said selenium-bearing material with from 3 to 10% by weight of a binder and sufficient water to provide a consistency suitable for agglomerating the mixture, compacting the resulting mixture to produce porous agglomerates having a maximum thickness of from ⅛ to ¾ of an inch, heating a charge of the resulting agglomerates consisting of a charge bed thickness in excess of 1 and not more than about 6 inches to a temperature between 1100 and 1500° F. and in the presence of a selenium-oxidizing atmosphere to oxidize the selenium content of said agglomerates and to volatilize selenium dioxide therefrom without appreciably fusing the charge.

3. The process of claim 2 wherein the binder is bentonite and wherein the oxidizing atmosphere is freely admitted air heated to between 1100 and 1500° F. to provide the required heating of the agglomerated charge.

4. In the process for treating a selenium-bearing material such as copper anode slimes, muds, sludges and dusts wherein the material together with an alkali metal reagent selected from the group consisting of alkali metal carbonates, hydroxides, nitrates and mixtures thereof is roasted to oxidize the selenium content thereof and to render the same water-soluble whereby the subsequent selective separation of selenium from said material is facilitated, the improvement which comprises intimately mixing the selenium-bearing material with from 35 to 60% by weight of said alkali metal reagent and sufficient water to provide a suitable consistency for agglomeration, compacting the resulting mixture to provide porous agglomerates having a maximum thickness of from ⅛ to about ¾ of an inch, and roasting a charge of said agglomerates consisting of a charge bed thickness in excess of 1 and not more than 12 inches at a temperature between 700 and 1200° F. and in a selenium-oxidizing atmosphere for a period of time sufficient to oxidize substantially all of the selenium content of the charge and to convert said selenium to water-soluble form without appreciably fusing said charge and separating the oxidized, water-soluble selenium from the roasted agglomerates.

5. The process for treating selenium-bearing materials such as copper anode slimes, muds, sludges and dusts for the separation of selenium values therefrom which comprises intimately mixing said material with from 35 to 60% by weight of sodium carbonate and with sufficient water to provide a suitable consistency of the mixture for agglomeration, compacting the resulting mixture to provide porous agglomerates, roasting a charge of said agglomerates consisting of a charge bed thickness in excess of 1 and not more than about 6 inches at a temperature between 850 and 1150° F. in a selenium-oxidizing atmosphere thereby oxidizing the selenium content of the charge and converting said selenium to water-soluble form without appreciably fusing the agglomerates and separating the water-soluble selenium from the roasted agglomerates.

References Cited in the file of this patent

UNITED STATES PATENTS

| | | |
|---|---|---|
| 1,843,427 | Lubowsky | Feb. 2, 1932 |
| 2,010,870 | Lindblad | Aug. 13, 1935 |
| 2,378,824 | Betterton | June 9, 1945 |
| 2,582,386 | Komarek et al. | Jan. 15, 1952 |
| 2,592,421 | Heilmann | Apr. 8, 1952 |
| 2,681,851 | Sibert | June 22, 1954 |
| 2,775,509 | Lebedeff et al. | Dec. 25, 1956 |

OTHER REFERENCES

Mellor: "Comprehensive Treatise on Inorganic and Theoretical Chemistry," vol. 10, page 699, last paragraph.

Dudley: "Toxicology of Selenium," The American Journal of Hygiene, vol. 24, No. 2, page 234, September 1936.

UNITED STATES PATENT OFFICE

CERTIFICATE OF CORRECTION

Patent No. 2,948,591                              August 9, 1960

Erwin C. Handwerk et al.

It is hereby certified that error appears in the printed specification of the above numbered patent requiring correction and that the said Letters Patent should read as corrected below.

Column 1, line 46, for "accepated" read -- accepted --; column 5, line 1, after "as" insert -- a --; column 8, line 63, for "100 parts", second occurrence, read -- 10 parts --.

Signed and sealed this 31st day of January 1961.

(SEAL
Attest:

KARL H. AXLINE
Attesting Officer

ROBERT C. WATSON
Commissioner of Patents